US008921466B2

(12) United States Patent
Satpathy et al.

(10) Patent No.: US 8,921,466 B2
(45) Date of Patent: Dec. 30, 2014

(54) CONCURRENT SOLID AND MELT STATE GRAFTING OF COAGENTS FOR MAKING LONG CHAIN BRANCHED POLYPROPYLENE VIA DIRECT REACTIVE EXTRUSION PROCESS

(75) Inventors: Uma Sankar Satpathy, Gujarat (IN); Shashikant, Gujarat (IN); Ajit Behari Mathur, Gujarat (IN)

(73) Assignee: Reliance Industries Limited, Mumbai, Maharashtra (IN)

( * ) Notice: Subject to any disclaimer, the term of this patent is extended or adjusted under 35 U.S.C. 154(b) by 0 days.

(21) Appl. No.: 13/522,073

(22) PCT Filed: Jan. 14, 2011

(86) PCT No.: PCT/IN2011/000027
§ 371 (c)(1),
(2), (4) Date: Jul. 13, 2012

(87) PCT Pub. No.: WO2011/086581
PCT Pub. Date: Jul. 21, 2011

(65) Prior Publication Data
US 2013/0059958 A1 Mar. 7, 2013

(30) Foreign Application Priority Data

Jan. 15, 2010 (IN) .......................... 2479/MUM/2009

(51) Int. Cl.
| C01F 7/00 | (2006.01) |
| B32B 17/10 | (2006.01) |
| C08L 33/00 | (2006.01) |
| C09K 15/32 | (2006.01) |
| C08F 210/00 | (2006.01) |
| C08F 110/06 | (2006.01) |
| C08K 5/00 | (2006.01) |
| C08F 255/02 | (2006.01) |
| C08F 8/00 | (2006.01) |
| C08F 210/06 | (2006.01) |

(52) U.S. Cl.
CPC ............. *C08F 255/02* (2013.01); *C08F 210/06* (2013.01); *C08K 5/005* (2013.01); *C08F 8/00* (2013.01)
USPC ...... 524/153; 524/533; 524/290; 252/400.24; 526/348; 526/351

(58) Field of Classification Search
USPC ..................... 524/153, 533, 290; 252/400.24; 526/348, 351
See application file for complete search history.

(56) References Cited

U.S. PATENT DOCUMENTS

| 5,560,886 A | * | 10/1996 | Saito et al. ..................... 264/485 |
| 6,632,854 B1 | * | 10/2003 | Charlier ......................... 522/157 |
| 6,774,186 B2 | * | 8/2004 | Walton ........................... 525/191 |
| 2004/0171712 A1 | * | 9/2004 | Ojeda et al. ....................... 522/5 |

FOREIGN PATENT DOCUMENTS

WO    0188001 A1    11/2001

* cited by examiner

*Primary Examiner* — William Cheung
(74) *Attorney, Agent, or Firm* — Tim Tingkang Xia, Esq.; Morris, Manning & Martin, LLP

(57) ABSTRACT

A process of modifying propylene polymers via melt grafting of polyfunctional monomer (PFMs) involving pre-initiative step thereby facilitating perfect absorption of PFMs on polymer matrix and initiate their grafting prior to reactive extrusion without using free radical initiators so that branching can be introduced in propylene polymer matrix. The modified propylene polymers showed enhanced shear sensitivity, increase in molecular weight, broadening of molecular weight distribution and strain hardening.

17 Claims, 3 Drawing Sheets

Change in molecular weight and molecular weight distribution of PP homopolymer on modification with and without Irgaphos 168

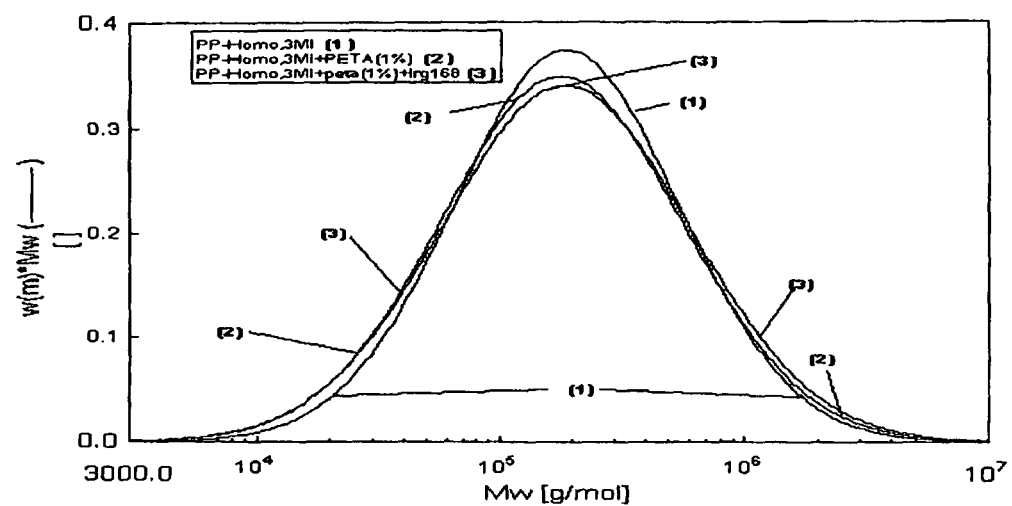
Fig.1: Change in molecular weight and molecular weight distribution of PP homopolymer on modification with and without Irgaphos 168

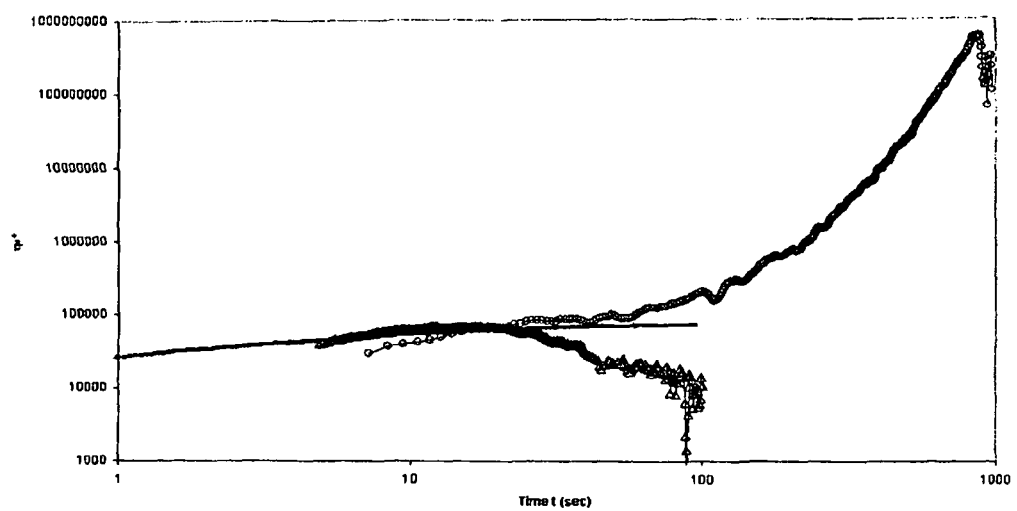
Fig.2 Change in extensional viscosity of PP homopolymer on modification
(Δ) Unmodified PP (o) Modified PP

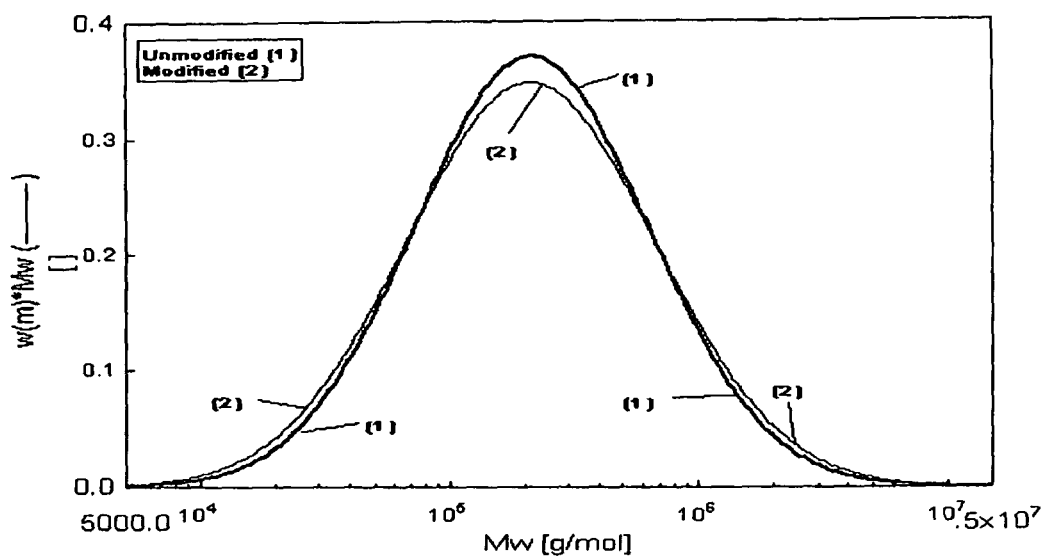
Fig. 3: MWD of PP-ICP (MI: 1.5dg/min) before and after modification

CONCURRENT SOLID AND MELT STATE GRAFTING OF COAGENTS FOR MAKING LONG CHAIN BRANCHED POLYPROPYLENE VIA DIRECT REACTIVE EXTRUSION PROCESS

This is the U.S. National Stage of International Application No. PCT/IN11/00027, filed Jan. 14, 2011, which claims the benefit of India Application No. 2479/MUM/2009, filed Jan. 15, 2010. Both applications are incorporated herein in their entirety.

FIELD OF INVENTION

This invention relates generally to methods for production of polypropylenes having improved properties and more particularly branched polypropylenes having improved properties, specifically higher melt strength, via concurrent solid & melt state grafting of a coagent, said coagent being a polyfunctional monomer (PFM).

BACKGROUND OF THE INVENTION

Propylene polymer resins have enjoyed significant growth in recent years. In addition to propylene homopolymer, numerous copolymers with ethylene and other alpha-olefins are commercially produced. These include random copolymers, block copolymers and multi-phase polymer systems. This latter group of resins includes the so-called impact copolymers and thermoplastic elastomers (TPEs), which contain a continuous phase of a crystalline polymer, e.g., highly isotactic polypropylene homopolymer, and those having a rubbery phase, e.g., ethylene-propylene copolymer.

These resins are widely used for extrusion for the production of films, fibers, and a range of molded goods, such as bottles, hoses and tubing, automobile parts and the like. While it is necessary that these resins have sufficiently low melt viscosity under conditions of high shear encountered in the extruder, the resin must also have sufficient melt strength after extrusion to prevent sagging or distortion of the extrudate before it is cooled below the melt point. High melt strength resins are particularly advantageous for the production of large thermoformed and blow molded articles, as well as foam and extruded sheets.

Isotactic Polypropylene (IPP) has become one of the most widely used commercial polymers because of its many desirable and beneficial physical properties such as low density, high melting point, high mechanical strength and chemical resistance. However, commercial PP is made up of linear molecules, and hence this material has relatively low melt strength and exhibits no strain hardening behavior in melt state. The linear molecular structure of PP is a direct result of the stereo-regulating catalyst (Ziegler-Natta catalyst) used for its production. Thus its uses have been limited in applications requiring high melt strength (Hmelt strength), such as blow molding, foaming and thermoforming. Therefore, the development of Hmelt strength-PP through incorporation of long chain branching has gained high importance in the past one decade.

Polypropylene has become more and more attractive for many different commercial applications. One reason might be that new developed processes based on single-site-catalyst systems open the possibility to tailor new polypropylenes for demanding end-applications, which has been not possible for a long time. Quite often such new polypropylenes based on single-site-catalyst systems are employed in case materials with a high stiffness are required. Moreover the amount of xylene soluble compared to conventional Zieglar-Natta products can be significantly lowered which opens the possibility to use polypropylene in niche areas as in the field of medicine or food packaging. However another factor that must be considered when developing new materials is whether they can be produced with reasonable effort. High output rates along with a minimum of energy requirement are appreciated (inter alia the polypropylene shall be formable at low temperatures). However, normally better process properties are at the cost of inferior solid state properties. Thus it is always required to achieve a balance between processability and end-product properties. Up to now there is still the need to develop polypropylenes which can be used in high demanding applications requiring good mechanical properties as high temperature resistance and stiffness, as well as high levels of purity. On the other hand said polypropylenes shall be easily processable.

Mechanistically, the reactivity of PP stems from its hydrogen atoms along the hydrocarbon skeleton that are subjected to free radical attack. The free radicals generated either by peroxide decomposition or in air/oxygen atmosphere, abstract the labile proton on the tertiary carbon sites. The macro radicals of PP will undergo either degradation leading to chain cleavage by β scission or grafting. Furthermore, due to the high instability of tertiary macro radicals, the degradation process is extremely fast at high temp. (T>Melting temperature). Thus stabilizing & consuming macro radicals in favor of grafting are the means to reduce the chain degradation. It is necessary to build the branched molecular structure from linear molecules that are destroyed by scission via a PFM. The envisaged chemical modification must favor the grafting reaction between the polymer chains over the β scission reaction. Another difficulty of free radical grafting arises from the competition between monomer grafting & homo polymerization. But this has been resolved in this invention by careful manipulation of process variables using relatively low dose acrylic based poly functional modifier.

Efforts to achieve the aforementioned objectives find mention in the art. One of such methodologies is introduction of branches into linear PP to produce "high melt strength PP(H-MS-PP)" having enhanced processability. Basically, branched PP is produced by subjecting PP to treatments which cleave chains, creating free radicals, & subsequently controlling the recombination of these chain fragments through kinetic & other process variables namely time, temperature, chemical environment etc. Tailoring the level of branching for specific applications involves controlling the branching process, compounding a branched PP (bPP) component into an appropriate linear PP either homo-PP/random or heterophasic copolymer (R-PP or PP-ICP) alone or both in a master batch or direct in situ situation. Whichever route is chosen, the finished resin largely retains the solid phase properties of the main PP components. These and other objectives of making long chain branched PP (LCB-PP) by a direct simple & cost effective reactive extrusion process has been focus of research by the present inventors, who have come up with novel solutions for achieving the said objectives.

Several methods have been used for increasing the melt strength of polypropylene, including oxidation and radiative treatments. The introduction of long chain branching (LCB) has also been used as highlighted in current patent & non-patent literature as for example, U.S. Pat. No. 6,306,970 B1; WO2007100436; Polymer Engineering & science, p-1339-13444, 2008; Macromolecules, Vol-37, p-9465, 2004; Polymer, Vol 47, p-7962-7969, 2006; Korea-Australia Rheology Journal Vol-11, No-4, December p-305-311, 1999. However, such methods typically require additional process steps beyond the steps required for the polymerization reaction. These additional steps pose several inconveniences including decreased processing efficiency and increased processing cost. Accordingly, it would be desirable to produce a high melt strength polypropylene by more convenient and less costly means.

Compared with a linear polymer having the same molecular weight, a long chain branch polymer shows high shear sensitivity, zero shear viscosity; melt elasticity, and high impact strength (Grassley, Ace. Chem. Res. 1977, 10, 332; Bersted, et al. J. Appl. Polym. Sci. 1981, 26, 1001; Roovers, Macromolecules 1991, 24, 5895). LCB polymers exhibit higher melt viscosities at low shear rates and lower viscosities at high shear rates. Shear thinning is advantageous in polymer processing, such as under high shear conditions. Further, high melt strength, i.e. increasing resistance to stretching during elongation of the molten material, is a desirable mechanical property which is important for thermoforming, extrusion coating, and blow molding processes involving predominately elongation flows.

U.S. Pat. No. 4,916,198 discloses a process of making high melt strength PP via irradiation process where oxygen concentration is controlled during ionic radiation exposure. In fact, it is believed that most of the reaction (chain scission) is restricted in the amorphous regions during solid-state modification & require thermal exposure of the irradiated polymer (as solid) so as to deactivate the available macro free radicals in the irradiated polymer either by fluidized bed process or melt kneading.

However, because the irradiation results in chain scission, even though there is recombination of chain fragments to reform chains, as well as joining of chain fragments to chains to form branches, there can be a net reduction in weight average molecular weight between the starting material and the end product, the desired substantially branched, high molecular weight, propylene polymer material. The cross-linked fraction of material is known to cause gelling in the products of thin cross-sections and also causes imbalance in the required mechanical properties. Objective is to develop the polymer which has the characteristics of strain hardening—thus with improved neck-in and sagging.

U.S. Pat. No. 6,774,186 discloses a free radical coagent which is a monomer or low molecular weight polymer having two or more functional groups with high response to free radicals. Typically, these functional groups are methacrylate, allyl or vinyl types. The free radical from peroxides enhances the rheological modification. Firstly, by peroxide induced allylic hydrogen abstraction from the co agent, a lower energy state, longer-lived free radical is created. This free radical can then induce branching in the ethylene elastomer by hydrogen abstraction. Due to the lower energy state of the free radical, beta-scission and disproportionation of either polypropylene or ethylene elastomer phase is less likely to occur. Secondly, the multifunctional co agent can act as a bridging group between the polymer chains. Suitable free radical coagents for this application would include diallyl terephthalate, triallylcyanurate, triallylisocyanurate, 1,2 polybutadiene, divinyl benzene, trimethylolpropane trimethacrylate, polyethylene glycol dimethacrylate, ethylene glycol dimethacrylate, pentaerythritol triacrylate, allyl methacrylate, N N'-m-phenylene bismaleimide, toluene bismaleimide-p-quinone dioxime, nitrobenzene, diphenylguanidine. Preferred coagents are triallylcyanurate, 1,2 polybutadiene, divinyl benzene, and trimethyolpropane trimethacrylate. The coagent is suitably present in an amount that is within the range of about 100 to 10,000 parts per million by weight. The range is desirably from about 500 to 5,000 parts, preferably from 1,000 to 3,000 parts per million by weight.

The peroxide and free radical co agent can be added by any conventional means. Illustrative procedures include imbibing it onto polymer pellets prior to compounding, adding it to polymer pellets as the pellets enter a compounding apparatus such as at the throat of an extruder, adding it to a polymer melt in a compounding apparatus such as a Haake, a Banbury mixer, a Farrel continuous mixer or a Buss-co-Kneader or injecting it into an extruder, at 100% active ingredients (i.e., neat) or optionally as a dispersion or solution in an oil, such as a processing oil, at a point where the extruder contents are in molten form. A preferred procedure is imbibing the peroxide and coagent into the polymer pellets prior to compounding.

Furthermore, despite intense interest and many research attempts, so far there is no known commercial process based on polymerization or direct chemically solid state post modification for preparing long chain branched polypropylene (LCB-PP). In a direct polymerization process, one major difficulty of in situ preparing LCB-PP polymers is due to the complicated PP macro monomer structures. There are two possible monomer insertion modes (including 1,2- and 2,1-insertions) and multiple chain termination mechanisms that can lead to polypropylene with various chain ends (Weng, et al. Macromol. Rapid Commun. 2000, 21, 1 103), while only the vinyl chain end is effective for LCB formation. Furthermore, the preparation of the most important isotactic polypropylene requires iso-specific catalysts, such as rac-Me2Si[2-Me-4-Ph(Ind)]2ZrCl2/MAO, which have limited special opening at the active site for incorporating macro monomers. Therefore, it is extremely difficult to find a catalyst system that can accommodate all the requirements, namely in situ formation of a significant amount of vinyl-terminated PP macro monomers and further incorporation of macro monomers into LCB-PP structure. In addition, under some reaction conditions, a small portion of the incorporated diolefin units might engage double enchainment, and the increase of cross-over structures in the polymer results in unprocessible (cross linked) polymer network. Thus, there is a continuing need for LCB polymers as well as methods and reagents for use in their synthesis.

The study reported in Macromolecules, 2001, 34 (17), pp 6056-6063 shows the effectiveness and its important role of a long relaxation time mode in order to enhance melt properties of PP. An introduction of long chain may be the exceptional methodology to obtain excellent melt properties without any disadvantages such as decompositions, aggravation of physical properties, etc. The PP with enhanced melt properties will find applications such as foaming, blow molding, thermoforming, and so on. The points made so far about an introduction of small amounts of ultra high molecular weight polymer could apply in principle to any polymer. Recently, considerable progress has been made in polymer dynamics and precision polymerization. This study would be also expected as a guiding principle in designing new materials with desirable processability.

WO/1994/007930 discloses processes for producing novel polyolefin polymers, and applications thereof. The structural features of polyolefin's that are considered most significant are molecular weight, which is related to polymer chain length, the type and tacticity of side-chain branches, and the distribution of side-chain branches along the main polymer chains. The random nature of most polymerization processes results in a heterogeneous polymer, rather than a truly homogeneous polymer product. Polyolefins produced by classical Ziegler-Natta catalysts consist of mixtures of molecules of different molecular weights and different amounts of comonomer incorporation. These differences result from the differences in catalysts used, and differing rates of comonomer incorporations. Other factors influencing polymer products include choice of monomers, catalyst reactivity or ability to incorporate co monomers, and differing polymerization process conditions.

WO/2004/046208 discloses a method for producing branched polypropylenes having improved processability and good mechanical strength. On the other hand, WO/1994/007930 relates to a process for preparing polypropylene and its copolymers having high melt strength. More specifically; the present invention relates to a process for preparing polypropylene and its copolymers, having high strength to shear free flow in the melt, while maintaining melt flow index suitable to processing.

EP1380613 discloses a process of producing polypropylene having increased melt strength by irradiating polypropylene in pellet form with an electron beam having an energy of from 0.5 to 25 MeV, delivered by an accelerator having a power of from 50 to 1000 kW and with a total radiation dose of from 10 to 120 kGray, characterised in that the irradiation is carried out in the presence of air.

U.S. Pat. No. 6,632,854 discloses an irradiation based process for production of polypropylene having improved properties via melt grafting of a coagent for forming long chain branches on the polypropylene molecules. Furthermore, U.S. Pat. No. 6,699,919 discloses a process of modifying Polypropylene having enhanced long chain branching and increased melts strength via grafting of modifier to generate long chain branches on to the polypropylene matrix. However this process is complex requiring accurate performance of multiple steps which makes the process cumbersome to implement in the industry.

EP0634441 discloses is a normally solid, high molecular weight, non-linear, substantially gel-free, propylene polymer material characterized by high melt strength due to strain hardening which is believed to be caused by free-end long chain branches of the molecular chains forming the polymer. Further disclosed is the use of the strain hardening polymer in extensional flow operations such as, for example, extrusion coating, film production, foaming and thermoforming.

For example, EP190,889A and U.S. Pat. No. 5,541,236A disclose a process for irradiating polypropylene to increase the melt strength thereof. It is disclosed that a linear propylene polymer material is irradiated under nitrogen with high energy ionizing radiation, preferably an electron beam, at a dose rate in the range of about 1 to 1×10 <4> Mrads per minute for a period of time sufficient for the appearance of long chain branching concomitantly with chain scission, but insufficient to cause gelation of the material. Thereafter, the material is maintained under the same inert environment, for a period of time sufficient for a significant amount of long chain branches to form. Finally, the material is treated to deactivate substantially all free radicals present in the irradiated material.

There are also some reports on the direct synthesis of long chain branched PP: using metallocene catalysis either directly or via the addition of pre-made PP macro monomers; using conjugated diene monomers; via the metallocene-mediated polymerization of PP in the presence of T-reagent p-(3-butenyl) styrene (Macromolecules 1999; 32:8678-80 & Macromolecules 2007; 40:2712-20).

U.S. Pat. No. 6,770,697 discloses a novel process of making high melt strength Polyolefin composition using master batch organo-clay in polyolefin. Applications include thermoforming, blow molding, foaming and spinning. Further, WO/2006/007512 describes a one pot process & reagent for producing long chain branched PP wherein in claim-3, long chain branched polypropylene has a melting temperature higher than 140° C.

A preferred multistage process is a "loop-gas phase"-process, such as developed by Borealis AIS, Denmark (known as BORSTAR® technology) described e.g. in patent literature, such as in EP 0 887 379 or in WO 92/12182. Multimodal polymers can be produced according to several processes which are described, e.g. in WO 92/12182, EP 0 887 379 and WO 97/22633. A multimodal polypropylene according to this invention is produced preferably in a multi-stage process in a multi-stage reaction sequence as described in WO 92/12182. The contents of this document are included herein by reference.

The electron beam irradiation of linear PP has been used to prepare PP with long chain branches or PP-Hmelt strength, as disclosed in PCT91/13933. The radiation leads to a hydrogen abstraction and under optimum reaction conditions-inert atmosphere and low temperature—the radical combination leads to formation of long chain branches. For example, the weight-average molecular mass is 298000 before irradiation with a 6 Mrad electron beam and 125000 after U.S. Pat. No. 5,605,936. Lucas et. al. have investigated the cross-linking of a propylene-ethylene random copolymer irradiated with a γ or an electron beam of ionizing radiation in air (U.S. Pat. No. 5,439,949). The efficiency of cross-linking was determined by refluxing in boiling xylene for 12 h. The gel content goes to 7.1 wt % with 10 M rad γ-radiation. Saito and coauthors have studied the cross-linking of PP irradiated with an electron beam under nitrogen in the presence of 1,6-hexanediol diacrylate used as coagent (U.S. Pat. No. 5,560,886).

In a European patent, Braga and Ghisellinii have obtained a mixture of cross-linked and non-cross-linked PP by a reactive extrusion process with a peroxide and a cross-linking agent (EP 0456342). Recently, new furfural compounds were introduced to obtain cross-linked PP (Polymer, 43, 1115; 2002). Further, Yu et. al. have prepared branched PP with 2,5-dimethyl-2,5-di(tert-butyl peroxy) hexane as initiator and Pentaerythritoltetraacrylate as cross-linking agent and stabilizer (Annual Tech. Conf. 2000; p-399). The transient recoverable strain measurements of modified PP indicate a increasing of elasticity due to the creation of branched structure.

PP with long chain branches were obtained using reactive extrusion in the presence of peroxydicarbonates (WO00108072) without any cross-linking co-agent where the type of peroxydicarbonates used controlled degree of long chain branches. Lu and Chung proposed a new method to prepare long chain branched PP with relatively well-defined molecular structure (Macromolecules; 35; 1999, p-8678). The chemistry involves a graft-onto reaction between malefic anhydride grafted PP and several amine group terminated PPs. The formed PP with long chain branches has an imide linkage that connects the PP backbone and each PP side chain.

Indeed, several researchers have successfully combined the positive properties of solid state chemical modification with the production of LCB-PP. Kim & Kim used the peroxide activation of four different coagents to produce LCB-PP samples whose melt rheological properties were characterized by melt flow index measurements (Adv. Polym. Technology; 1993; vol 12; p-263-269). Wang et. al. extended this work to detailed analyses of the steady shear viscosity and MWD of LCB-PP samples derived from reactions of PP with PETA (Ph.D Thesis, University of Waterloo; 1996). Analogous reaction products derived from TMPTA were prepared by Nam et. al. Who characterized melt-state rheological properties under oscillatory shear & extensional deformations (J. Appld. Polym. Sci? Vol 96; p-1793-2000; 2005). Continuing on this line of research, Borsig et. al prepared LCB-PP materials using divinylbenzene, hydroquinone & difurfuryl sulphide as co agents & characterized these derivatives by single-detector GPC & oscillatory shear rheometry (European Polymer Journal 44 (2008) 200-212) which has been updated currently.

Work on Hmelt strength-PP was further updated in a current publication (Journal of Applied Polymer Science, Vol. 110, 3727-3732 (2008)) where the Hmelt strength-PP was synthesized via silane grafting initiated by in situ heat induction reaction, in which pure PP powders without any additives and vinyl trimethoxysilane (VTmelt strength) were used as a basic resin and a grafting and cross linking agent, respectively.

WO/2007/100436 discloses a process of making Hmelt strength-PP via reactor polymerization of PP under multiple steps where process allow to combine the first quantity of polypropylene with the second quantity of polypropylene to form a bimodal polypropylene; wherein the percent by weight of the first quantity of polypropylene in the bimodal polypropylene composition is equal to or greater than 65 percent, and the ratio Mw,B/Mw,A is at least about 2.

WO/2008/006530 provides a polypropylene having good process properties, as low processing temperature and high process stability, in combination with good mechanical properties as high stiffness and high purity, i.e. rather low amounts of extractable fractions. The finding of the present invention is to provide a polypropylene with improved balance between mechanical and process properties by introducing a specific degree of short-chain branching and a specific amount of non-crystalline areas.

More precisely, the present invention is related to a polypropylene having a) xylene soluble (XS) of at least 0.5 wt.-% and b) a strain hardening index of at least 0.15 measured by a deformation rate $d\epsilon/dt$ of $1.00$ s"1 at a temperature of 180° C., wherein the strain hardening index (SHI) is defined as the slope of the logarithm to the basis 10 of the tensile stress growth function (Ig ($\eta\epsilon$+)) as function of the logarithm to the basis 10 of the Hencky strain (Ig ($\epsilon$)) in the range of the Hencky strains between 1 and 3.

Hmelt strength-PP is achievable by incorporation of long chain branching, which is made possible via electron beam (EB) irradiation process on commercial scale. The EB causes scission of the PP chains; the radicals so formed undergo controlled recombination, leading to LCB formation. Basell Pro-Fax PF 814, Borealis Daploy 130d have both the aforementioned long-chain branching structure, introduced by a post-reactor step, either by irradiation (Basell) or by reactive extrusion (Borealis), and are up to now the main materials successfully used to produce very low density foam. Modified PP is commercially available from Basell, Borealis etc that are used in foaming, thermoforming & extrusion coating processes. The electron beam method is carried out when PP is in solid state while other chemical modification is carried out when PP is in molten state. However, it is known that the use of high-energy radiation produces branching confined for the most part to the amorphous phase of the semi crystalline PP, since it is in this region that the segmental mobility and free volume are sufficient for macro radicals formed on irradiation to approach one another and form branches. In principle, branches can also be introduced onto the PP backbone by post reactor grafting reactions. Wang et. al did model for branched PPs by the reaction between a randomly functionalized PP and hexadecyl amine, a long chain alkyl amine that was used as a model molecule for a terminally functionalized PP. The constrained geometry catalyst (CGC) has also been found to be very useful for preparing LCB polyolefin. However, this is limited to laboratory scale only.

Even though most commercial Hmelt strength-PP is produced now by electron beam irradiation, the method of using peroxydicarbonates and reactive extrusion has recently regained interest to modify polypropylene. Another alternative to incorporate branching in PP may be through the recombination reactions in which PP molecules react with a polyfunctional (PFM) monomer, having more than two double bonds, in the presence of peroxide. It is well known that at relatively low concentration of peroxide the primary radicals generated will abstract preferentially the tertiary hydrogen, forming tertiary PP macro radicals that are unstable and degrade through β-scission reactions. However, addition of a polyfunctional monomer to the above system can convert some of the tertiary macro radicals to the more stable secondary macro radicals which tend to undergo recombination rather than scission owing to the randomness of these recombination reactions, PP chains may be extended, branched or even cross linked.

Lagendijk et. al investigated the efficiency of peroxydicarbonate (PODIC) for the modifications of PP. All PODIC modified samples show enhanced strain hardening, and PODIC with no-linear or large linear alkyl groups resulted in the modified PP with highest degree of branching with high degree of strain hardening. Wang et. al. used PFM i.e. Pentaerythritol triacrylate (PETA), and 2,5-dimethyl-2,5(tert-butylperoxy) hexane peroxide to produce branched PP and studied their melt flow properties by capillary rheometery and thermal properties. They discussed the effects of the concentration of peroxide and monomer on gel content. Low concentration of PETA and peroxide was suggested to minimize the formation of macro-gels. Monomers with different functionality were studied by Yoshi et. al.; the result showed that relatively shorter chain bifunctional monomers such as 1,4-butanediol diacrylate (BDDA) and 1,6-hexanediol diacrylate (HDDA) are better for improving the melt strength of PP.

To make PP having good mechanical properties and high melt strength, scientists have explored many methods such as blending, radiation cross linking and peroxide cross linking. Unfortunately, these methods have some disadvantages. For example, blending damages the properties of PP, especially the high temperature properties. Radiation cross-linking is limited by the material's thickness, and the process needs an inert atmosphere, which results in high cost and complicated manufacturing technology.

The peroxide cross-linking induces serious degradation of PP chains and even cross-linking. However, among the reported methods of preparing Hmelt strength-PP, direct solid state chemical modification of linear PP chains is still the simplest as well as economical and of course most appropriate for the applications compared to even currently developed silane grafting process for making Hmelt strength-PP as its process insight yet require in depth attention for commercial exploitation. Therefore, the current invention when particularly compared with exiting radiation and peroxide cross linked PP including silane grafting, the way of making branched/cross-linkable PP through simple melt grafting polyfunctional monomer in absence of any catalyst has various advantages, such as easy processing, low cost and capital investment, and favorable properties in the processed materials.

The grafting of coagent in this invention can be carried out by melt kneading of polymer with suitable device like single or twin screw extruder or in batch mode in one-step polymer processing. In this case, the extruder becomes the chemical reactor, which may involve high temperature, high viscosity, etc. With a linear chain, two approaches allow the transition of the flow regime for the same deformation rate: an increase of molecular weight or the grafting of long branches. The grafting is preferable to limit the increase of the shear viscosity. The branched polypropylenes show strain hardening in elongational flow of polypropylene and high melt strength. According to Gaylor, the Hmelt strength-PP is characterized by a bimodal molecular weight distribution, wherein the higher molecular weight fraction contains branched polymer.

The melt strength and elongation behaviors of modified PP are strongly related to the degree and length of LCB. The length necessary for a branch to behave as a long chain branch is 2Me (Me: MW between entanglements. As compared to various known techniques, melt rheology has been found to provide significant evidence of incorporation of long chain branching in the polymer chains. Hence, rheological techniques are Prevalent to detect the presence of LCB, though it is an indirect method. Therefore in the current invention dynamic rheometer is used to evaluate melt rheological characteristics of modified samples which ultimately provide evidence of strain hardening & high melt strength resulting from the incorporation of long chain branching.

In the past decade, many researchers have investigated LCB polyolefin by rheological method, but most studies focus on PE or model polymers and only a few are about LCB-PP, because LCB-PP is difficult to be obtained and the degree of LCB is very low. When PP is modified by peroxide and PFM, the reaction and the product components become very complex. Degradation reaction makes the MW to decrease, grafting reaction introduces short chain branching (SCB) structure, blanching reaction introduces LCB structure and gel will be produced if cross linking reaction can happen. Such complex reactions as well as the complex products make the investigation on LCB-PP very difficult and quite challenging.

Therefore, in the current approach efforts were made to make the process more simple & eco-friendly. More precisely, process is optimized in such a way that LCB-PP can be achieved via melt grafting of PFM either PETA or TMPTA under optimum process condition without using any catalyst. More particularly, current process primarily focused how to control kinetics of grafting process of acrylic based monomer coagent on polyolefin matrix so that during extrusion homo polymer formation should be strictly prohibited using normal dose of stabilizer/s either in nitrogen or in air environment subjecting a optimum predispersion innovative step in term of time & temperature prior to extrusion primarily to facilitate perfect dispersion & control branching to improve melt strength of either PP or PP-ICP copolymer via direct grafting process avoiding master batch situation as well as noninclusion of any peroxy radical forming catalyst which is mostly common in known prior art, for example, EP1952970 A1.

Therefore, based on current status reviewed above on the aspects of known prior art, process chemistry & structure—property relationship for LCB-PP/Hmelt strength-PP, there is yet a gap to refine process in term of process economy, efficiency & minimization of process steps which ultimately should qualify for commercialization. Overall, process should be smart enough to increase processing efficiency, minimizing off spec. products & thereby decrease the processing cost. Accordingly, it would be desirable to produce a high melt strength polypropylene by more convenient and less costly means.

OBJECT OF INVENTION

It is an object of the present invention to improve melt strength of linear PP via melt grafting of polyfuntional monomers primarily PETA and TMPTA without using any catalyst either in presence of air or nitrogen on a single or twin extruder preferably at lower concentration (i.e. below 1% w/w) by careful manipulation of process variables to develop branched structure within very low level of macro gel formation during direct reactive modification.

Another object of the present invention is to develop a formulation using normal stabilizer/s dosage which can facilitate effectively to produce long chain branched PP by direct approach using said acrylic based modifier in such a way that the integrity of branch structure remained intact even after multiple extrusions.

Yet another important object of this invention is to achieve optimum melt theological characteristics & relatively broader MW/MWD so that ultimately product can qualify for thermoform ability/deep drawing.

Still another object of the present invention is to provide a process to improve melt strength & extensibility by adding chain branches onto the PP backbone.

Another object of current invention effectively support modify both homo-PP & PPCP copolymer with wide range MFI Polyolefin matrix.

Yet another object of the invention is to broaden the processing window of PP whilst trying to maintain low scrap rates, satisfactory optical & mechanical properties required for target end products application.

Thus process flexibility indeed is an additional incentive which of course take care overall process economy, aided essence of process simplicity including widening of the scope of commercial viability.

SUMMARY OF INVENTION

Investigation carried out by the present inventors was primarily aimed to develop LCB-PP lead to Hmelt strength-PP via melt grafting of a selective acrylic Polyfunctional monomer (i.e. PFMs namely, Pentaerythritol triacrylate (PETA) & Trimethylolpropane triacrylate (TMPTA) as a potential modifier onto either homo-PP or random or heterophasic copolymer (R-PP or PP-ICP) matrix by reactive extrusion process under optimum process conditions without using any catalyst during modification. Polyfunctional monomer is also termed as modifier or coagent in the following text.

The present invention is directed to a effective & efficient process of modifying either plain homo-polypropylene or PP-ICP/random copolymer containing ethylene as comonomer with enhancing impact strength properties where the provided components are isotactic polypropylene, at least one impact modifying polymer, at least one primary coagent which is a Polyfunctional monomer/oligomers & there is a scope of at least one secondary co-agent which may be a bifunctional monomers in combination and at least can be thought of one radical initiator, where the components are mixed, homogenized in solid state and extruded as the polypropylene composition. The impact modifying polymer is an elastomer, which is preferably a copolymer of ethylene and an alpha-olefin such as that from ethylene and 1-octene. The secondary co-agent is a monovinyl monomer capable of undergoing vinyl addition by a radical route. Appropriate primary co agents are multifunctional monomer contains two or more unsaturated groups capable of undergoing radical addition. Appropriate radical initiator includes organoperoxides. Some or all of the components can be mixed prior to introduction to the extruder or mixed within the extruder by their addition at different feed points of the extruder.

The invention is also directed to a polypropylene composition having a structure where an isotactic polypropylene has been combined with a dispersed impact modifying polymer by branches on said polymers and bridges between said polymers which are linked repeating units from at least one primary co-agent, which is a polyfunctional monomers and at least one secondary co-agent, which is a di- or monofunctional monomer, oligomer or polymer, and residuals of at least one radical initiator.

These and other objects, advantages and benefits of the present invention will become apparent upon consideration of the following detailed description and discussion of embodiments thereof, particularly when taken in conjunction with the accompanying drawings, wherein like reference numerals in the various figures are utilized to designate like or similar components.

BRIEF DESCRIPTION OF THE DRAWINGS

FIG. 1 is graph indicating change in molecular weight and molecular weight distribution of PP homopolymer on modification with and without Irgaphos 168

FIG. 2 is graph indicating change in extensional viscosity of PP homopolymer on modification FIG. 3 is graph indicating change in molecular weight and molecular weight distribution on reactive extrusion.

DETAILED DESCRIPTION OF THE INVENTION

PP compositions are used for a variety of applications in which the composition is subjected to thermoforming or foaming operation. Application such of these require high melt strength (also known as melt elasticity) polymer so that the sheet being thermoformed or the polymer being foamed maintains sufficient structural integrity. If the melt strength is not high enough, the sheet can tear or become excessively thin during thermoforming, or the foam cells can burst/collapse during foaming. Unfortunately, PP made by conventional processes has relatively poor melt strength, and thus has a very narrow temperature window for melt processing.

Polypropylenes with long chain branches were prepared using reactive extrusion via melt grafting of a polyfunctional triacrylate monomer such as PETA & TEMPTA without using any free radical catalyst. Both of these monomers were found equally competent to reduce melt flow index significantly (i.e. up to 20 folds) under optimum process condition which was demonstrated experimentally. Under stringent condition kinetically reaction is well controlled & also does not produce homopolymer at extrusion modification stage. Initially, initiation of pre-grafting at elevated temperature prior to extrusion & also presence of stabilizer Irgaphos168 were the salient features of the refined process. More importantly, under this condition, modifier (PETA) was found more effective up to 2000 ppm which facilitated branching/grafting more effectively & thereby minimized chain scission & homopolymer formation. Basically, this favored the reaction between either PETA or TMPTA alone (or in combination) and macro radicals of PP and increased the efficiency of the branching. These were useful incentives to obtain LCB-PP structure via melt grafting process efficiently. The rate of branching was proportional to the PETA concentration (1-4% w/w). The process was scaled up from bench to pilot scale successfully on twin extruder at higher throughput rate without any additional energy consumption which is supportive further for up scaling the process.

The dynamic moduli of the modified polypropylenes produced on bench & pilot scale compared to the plain polypropylene show a growth of the elastic modulus corresponding to an increase of the terminal relaxation time. This confirms the presence of the long chain branches onto the polypropylene skeleton.

The aim of this study was to obtain branched PP by a reactive extrusion process. This is achieved by controlling chain scission through stabilization and consuming macro radicals in favor of grafting. It is necessary to build the branched molecular structure from that destroyed by β-scission via a polyfunctional monomer. The envisaged chemical modification must favor the grafting reaction between the polymer chains over the β-scission reaction. Another difficulty of free radical grafting arose from the competition between monomer grafting and homopolymerization. Polypropylene with long side branches can be obtained with a new chemical approach via judicious grafting of polyfunctional triacrylate monomer (1-2 w/w) in presence of Irgaphos 168 (1000-2000 ppm) & Irganox-1010 (400-500 ppm) under optimum extrusion conditions. The long chain branched structure was confirmed by melt elasticity & extensional properties which was further supported by micro structural behavior by FT-IR & thermal characteristics by DSC.

In the present invention the propylene polymer used for modification is a homopolymer (II=96-98%) or a mixture of homo and copolymer, wherein the homopolymer is of MI ranging from 0.3 to 40 dg/min and preferably 1.5 to 10 dg/min. The copolymers in the polymer mixture preferably contain ethylene comonomer in the range of 2.0 to 12% and have their MI ranging from 0.7 to 25 dg/min, preferably 2 to 10 dg/min. The mixture of homo and copolymer of propylene contain the former not less than 80%. The copolymer preferred in the mixture of polymers is of the same or higher MI as that of homopolymer.

The reaction mixture with its base as homopolymer or a mixture of homo and copolymer of propylene prepared is with or without ethylene-based polymers. The Polyethylenes used are low pressure homopolymer and ethylene-alpha olefin copolymer as well as high pressure homopolymer. The alpha olefin in the ethylene copolymer is of the carbon units ranging from C3 to C8 whereas the copolymer preferred is having either C4 or C8 comonomer in the range of 2 to 10%. The density of ethylene polymers used ranges from 0.90 to 0.955 g/cc and preferably 0.92 to 0.945 g/cc. The low-pressure homopolymer and ethylene-alpha olefin copolymers are preferred to prepare the reaction mixture. The quantity of ethylene homopolymer and/or copolymer used to prepare the polymer mixture with propylene polymer/s has been kept in the range of 0.5 to 25 phr and preferably in the lower concentration range.

PFMs such as vinyl esters and allylic ethers having two or more than two functional groups are used for the reactive modification of propylene polymer and polymer mixtures as stated above. The examples of these PFMs include 1,1,1-trimethylol-propane trimethacrylate, 1,1,1-trimethalolpropane triacrylate, 1,1,1-trimethylolethane triacrylate, triethylene glycol dimethacrylate, triethylene glycol diacrylate, tetraethylene glycol dimethacrylate, tetraethylene glycol dicarylate, pentaerythritol triacrylate, pentaerythritol tetramethacrylate, pentaerythritol tetraacrylate, glyceryl trimethacrylate, diethylene glycol dimethacrylate, diethylene glycol diacrylate, pentaerythritol triallyl ether and pentaerythritol tetraallyl ether. Wherever a mixture of PFMs is used at least one of them is vinyl ester. It is preferred to use PFM/s containing more than two reactive functional groups. The purity of PFM/s is essentially more than 99%. The quantity of PFM/s or their mixture used for modification of propylene polymer or their mixture is in the range of 0.1 to 8 phr and preferably 0.5 to 5 phr depending on the type of polymer or their mixtures and the type and amount of organic peroxide/s used in the reaction system. In order to achieve same degree of modification in terms of chemically bonded network structures in the modified polymeric materials, quantity of the PFM/s required depends on their chemical structure. With the increase in contents other than propylene in the polymer or polymer mixture, amount of modifier taken is smaller. This is because of the higher efficiency of macro radicals formed in ethylene blocks/polymer recombine more efficiently and form network structure as compared to propylene polymer segments/polymer.

Organic free radical initiators suitable for modification reaction are essentially peroxide/s or mixture of peroxides; more particularly alkyl peroxides and peroxy esters. The examples of the peroxides used are di-tert-butylperoxide, dicumyl peroxide, 1,3-bis(tert-butylperoxyisopropyl)benzene, tert-butylcumyl peroxide, 2,5-bis(tert-butylperoxy)-2,5-dimethylhexyne-3, diisopropylbenzene monohydroperoxide, 2,5-bis(tert-butylperoxy)-2,5-dimethylhexane, tert-butylperoxybenzoate and lauryl peroxide. Their selection is essentially based on the contents of polymer/polymer mixture, type and amount of PFM/s taken, reaction temperature and the retention time of the molten mass in the extruder. The criteria for the selection have been the half life of the peroxide/s, which is preferably 1 hr at about 130° C. Where ever required a mixture of two or more than two peroxides are taken and their gravimetric ratio (based on functionality) has been maintained in such a way that the free radicals formed are available in the system at any time during the reaction. The quantity of peroxide/s used in the reaction system is generally kept low with the increase in ethylene block/ethylene polymer/s in the reaction system. The amount of peroxide is taken in the range of 5 to 100 ppm and preferably 10 to 50 ppm of the polymer/polymer mixture.

The reaction mixture so prepared is kneaded and extruded using an extruder having L/D ratio as 25:1 to 45:1, in the temperature range of 170 to 270° C. The retention time of the molten mass in the barrel is controlled by selecting the suitable screw rpm depending on the type and amount of reactants, reaction temperature and L/D ratio of the extruder used for reactive modification. The screw rpm is set in such a way that the reacting molten mass of the polymer takes about 5 to 50 sec and preferably 5 to 30 sec to travel in the barrel. The feeding of reaction mixture is carried out with/without ultra pure nitrogen blanketing in the hopper in a controlled manner. It is preferred to starve feed the extruder using a controlled feed device. Strand die suitable for producing two or more strands and the auxiliary units for cooling the extrudate as well as a pelletizer are used to obtain granulated form of modified polymeric material. The size of the granules is maintained from 3 to 7 mm.

One of the important and imperative steps of the current invention is predispersion step of polyfunctional monomer under optimum temperature and retention time. Depending on the temperature and mixing style, it was possible to reduce predispersion time from many hours i.e from 20 to 30 hrs, more preferably 15-19 hrs to minutes having range 120 to 200 min, more preferably 100-150 min & yet more effective in the range 10-25 mints at a temperature range 60-1500 C, more preferably 100-1400 C & essentially could be more perfect in the range 60-700 C provided a suitable mixer is used.

In fact, the base propylene polymer is also preferably contacted with at least one PFM prior to thermal decomposition of the free radical generator. PFMs are basically absorbed by the base propylene polymer preferably at temperature of from 25-1400 C, preferably from 70-900 C. The monomer basically will have lower viscosity at elevated temperature & thereby situation will facilitate for better absorption & uniform distribution of monomer on polymer matrix. Preferably, the amount of PFM is from 0.2 to 15%, more preferably 0.25 to 10% & yet more suitably in the range 0.5 to 2.5%, based on the weight of the propylene polymer. As disclosed in known art, the average sorption time of the PFMs on the base polymer is advantageously from 10 to 10000 seconds, preferably from 20 to 800 seconds, particularly preferably from 60 to 600 seconds. The absorption of PFM is preferably performed in a continuous well designed through-flow mixer.

Essentially, another important feature of this process is mixing of modifier and necessary additives with base polymer in just one go but need to follow a systematic sequence of addition particularly for perfect mixing & dispersion of all ingredients irrespective of liquid or solid or both basically to maintain homogenization via mixing operation.

The present invention aims to provide polypropylene resins having long chain branching and thereby achieving improved melt strength and extensional stiffening of polypropylene. More particularly the MFI of homo-PP or copolymer should decrease from 1.2 to 20 folds & more preferably should decrease in the range 2-10 folds in order to achieve target melt strength & other melt rheological characteristics of polypropylene with higher molecular weight (MW) & broad molecular weight distribution (MWD) as compared to base polymer. As broad molecular weight distribution improves the processability of the polypropylene, the molecular weight distribution (MWD) is preferably in the range of 3 to 20 and still more preferably up to 8.00. In this invention, modified PP showed broad MWD, which remained in the range 3.5 to 6.5 & more preferably 4-5, respectively.

It is understood that branched architectures are desirable whenever melt strength and elongation viscosity are key material properties. It is also another important goal of the invention to provide a process to prepare polypropylene with substantially increased long chain branching on the polypropylene molecules via direct melt grafting of PFMs (either PETA or TMPTA or in mix) particularly at lower dose of coagent in the range 0.1 to 10% w/w, more preferably 0.1 to 4% w/w & even will be more effective in the range 0.25 to 1.5% w/w in presence of normal dosage of stabilizers—Irganox1010 & Irgaphos168 introducing a prestep to facilitate perfect dispersion of modifier which control overall process kinetics & economy of the said invention. It is a further aim to produce polypropylene having not only improved long chain branching and improved melt strength, but also improved recovery compliance and relaxation time.

In a particularly preferred embodiment of the invention, polypropylene homopolymer/PP-ICP in fluff or powder form either in air or in an oxygen-free environment is mixed with a coagent following a perfect dispersion prior to extrusion which is imperative & effective to maintain controlled branching without favoring homopolymerization of coagent during solvent free solid state reactive processing. Dispersion of coagent was carried out under optimum temperature & time using automated mixer. However, preferably, the coagent comprises from 0.1 to 5 wt % of the polymer, more preferably from 0.1 to 1 wt % of the polyolefin matrix (i.e. PP/PP-ICP). A particularly preferred coagent comprises long chain polyfunctional monomer being selected from acrylate family viz. PETA, TMPTA, Hexadecylmethacrylate (HDMA), octadecylmethacrylate (ODA), butylmethacrylate (BMA) etc in an amount of from 0.1 to 1 wt % based on the weight of the polypropylene, most particularly from 0.1 to 0.6 wt % based on the weight of the polypropylene.

According to the process of the present invention, it is a one-go formulation in batch where after perfect dispersion of modifier with selected grade of plain PP powder or fluff required quantity of conventional & mostly popular stabilizers/additives such as Irganox-1010 & Irgaphos-168 along with calcium stearate (CAS) were simply mixed for preferably 5-120 min & most preferably 5-20 min in a mixer at a preferable temperature 25-150° C., even convenient range may be 25-100° C. & even most preferably be 25-70° C. In fact normal mixing at ambient temperature takes longer time may be more than 15-20 hrs for dispersion to achieve melt properties which seems to be much more inferior condition compared to optimum dispersion condition of this present invention. More importantly & logically the prestep dispersion under optimum condition of this invention is a significant incentive for the overall process particularly in terms of both process efficiency & effectiveness along with very much suits to tag as eco-friendly process as well.

Further, in a particularly preferred embodiment of the invention the stabilizer role is quite significant in terms of a balanced & efficient formulation/composition where ultimately linear PP materials are transformed by radical-mediated chain scission & coagent-induced branching/cross linking, the balance of which dictates the resulting MWD, branch length & branch frequency. The stabilizers used are amongst the common class of stabilizers which include substituted phenols, amines, alkyl, aryl, and mixed alkyl-aryl phosphites/phosphonites, alkyl, aryl, and mixed alkyl-aryl phoshonates, lactone (3-arylbenzofuran-2-one), thioesters, thio compounds containing oxidizable sulphur and aryl nitroso compounds [mainly tetrakis(2,4-di-t-butylphenyl) 4,4'-biphenylenediphosphonite, Bis(2,4-di-t-butylphenyl) pentaerythritol diphosphite, tris(2,4-di-t-butylphenyl) phosphate, Bis(2,2,6,6-tetramethyl-4-piperidinyl) sebacate, 2,4,6-tri-t-butylphenyl 2-butyl-2-ethyl-1,3-propanediol phosphate, octadecyl 3,5 di-tert-butyl-4-hydroxyhydrocinnamate, 5,7-dit-butyl-3-(3,4 dimethylphenyl)-3H-benzofuran-2-one, tetrakismethylene (3,5-di-t-butyl-4-hydroxyhydrocinnamate) methane, distearylthiodropionate] or their mixtures.

A particularly preferred coagent comprises PETA which indeed play the prime role in governing the kinetics of the overall grafting process. When alone Irgaphos-168 is used with PETA, branching reaction is more favorable & even reduction in MFI become more sensitive compared to alone PETA situation in the formulation where in Irgafos-168 remained in the range 200-3000 ppm, more preferably 850-2000 ppm & even most preferably in the range 500 to 1500 & still can be thought of a more effective range 350-1000 ppm.

Further more, in the same embodiment of the invention, for optimum stability & permanent integrity of induced branched structure suitable composition & combination of both primary antioxidant Irganox1010 & secondary antioxidant Irgaphos168 was established & included in the process of LCB-PP wherein Irganox 1010 was maintained in the range 100-1000 ppm & more preferably 200 to 600 ppm. Overall, this composition of antioxidants was synergistically found very effective & efficient for the present invention & thereby normal dosage of stabilizer becomes one of the salient features of the inventive process of making Hmelt strength-PP. More importantly, LCB-PP was produced on a pilot scale in a continuous mode using twin screw extruder having tailored screw configuration where coagent was allowed to react completely in presence of normal of stabilizer under optimum temperature profile. MFI maintained consistency in all trials & branched structure retained its integrity which was convincing & conclusive based on melt rheological characteristics of multiple extruded LCB-PP samples. Extensional viscosity of the modified sample also provides evidence of strain hardening.

The details of the invention will further be explained by way of examples; however, they do not limit the scope of invention. The individual reactants in the formulations as given in the examples are maintained in phr, ppm and percentage by weight unless otherwise specified. The samples of modified polymeric materials have been analyzed for their melt flow index (MI), dynamic rheometery of melt, capillary rheometery, extensional viscosity, differential scanning calorimetery and gel permeation chromatography.

Example-1

The chain branching reaction was screened using a bench scale single screw extruder of screw diameter 25 mm & L/D ratio 25:1 on 500 g batch of plain homo-PP without using any stabilizer & free radical forming initiator. The modifier/s (PFMs)—2% (w/w)—Pentaerythritol triacrylate (PETA) & Trimethylolpropane triacrylate (TMPTA) were used for batch separately. The modifier was premixed thoroughly, dispersed at 55° C. for 2 hrs & then kept at room temperature for 16 hrs to ensure uniform dispersion of modifier on base polymer powder. The extruder temperature profile was maintained as: zone-1: 177° C.; Zone-2: 227° C.; Zone-3: 232° C. & Zone-4: 227° C. (die zone) with screw rpm 25. The extruded material was quenched & palletized. Finally, modified samples were characterized for MFI, MW, MWD & melt rheological characteristics as summarized in Table-1.

Example-2

The reaction mixture was prepared having batch size 500 g under different PETA concentration in the range 1.0 to 4.0% W/W with respect to plain PP. Pre-mixing of PETA was performed at temperature 100-120° C. for 30-45 min. In order to ensure uniform dispersion in all experiments other process variables were fixed prior to extrusion. Reaction mixture of every batch was then kneaded/extruded in a single screw extruder as described in example-1. The feeding of the reaction mixture was controlled with the help of screw feeder and carried out in air environment under similar temperature profile & rpm as described in example-1. Subsequently, same series was repeated with 2000 ppm of Irgaphos-168, which was scanned judiciously from stabilizer family. The modified molten polymer mass was passed through a strand die. The extrudate was quenched and palletized in the auxiliary unit to obtain granulated form of the material having length of 4-6 mm. The modified polymer was then evaluated for MFI, rheological characteristics and Tc. The results as compared with base polymer taken for modification are given in table-2 & FIG. 1.

Example-3

The reaction mixture was prepared, kneaded, extruded and palletised as per the modalities described in Example 1. Premixing was completed at a fixed temperature 130° C. for 30 minutes in presence of 1000 ppm Irgaphos-168 & 200 ppm Irganox-1010 using 1% to 4% PETA respectively. Mixing was a single pot job completed in an oven preset at required temperature to obtain uniform dispersion of modifier & thereby to improve efficiency of branching during reactive process. Results were summarized in table-3.

Example-4

2 kg homo-PP batch was prepared using 2% PETA as per procedure described in example-1. Prior to extrusion, mixing was completed at 60° C. in a high speed mixer for 10 minutes in order to maintain homogeneity in mixing so that it can facilitate better branching during reactive extrusion at a barrel temperature profile as: zone 1—180° C., zone 2—225° C., zone 3—245° C. and zone 4—240° C. keeping other process variables fixed. The kneading and extrusion was carried out without nitrogen blanketing. The palletization was followed according to the modalities given in Example 1.

MFI & melt characteristics of modified polymer were reported in Table-4. PETA incorporation was confirmed by FT-IR & strain-hardening characteristics were also confirmed by melt extensional viscosity measurement as shown in FIG. 2.

Example-5

The reaction mixture was prepared as per the procedure described in Example 1. However, the concentration of PFM was kept as 2.5 phr without using the initiator. The extruder temperature profile (single screw) was maintained in the barrel as: zone 1—185° C., zone 2—220° C., zone 3—240° C. and zone 4—240° C. The kneading and extrusion was carried out without nitrogen blanketing. The palletization was followed according to the modalities given in Example 1. The solubility behavior and melt characteristics of modified polymer are reported in Table 5.

Example-6

1 KG batch of Homo-PP was prepared using 1% W/W PETA at different Irgaphos-168 concentration in the range 1000-3000 PPM keeping other variables fixed. The temperature profile & other process conditions were same as given in example-1 & also same procedure was followed for completing the experiment. However, premixing of the batch was same as described in Example-4. Results were summarized in table-6.

Example-7

The mixing, kneading, extrusion and palletization of reaction mixture 1 kg of PP-ICP copolymer powder having MFI 3.0 thoroughly premixed with 0.5% w/w PETA in presence of 250 ppm Irganox-1010 & 750 ppm of Irgaphos-168, respectively was carried out as per the methodology described in Example-1 & 4. The extrusion conditions as given in example-1 were maintained for the modification. Extruded material was finally characterized for MFI, melt characteristics including extensional viscosity to ensure strain hardening. Broadening of MW/MWD, melt rheological and thermal analysis data provide evidence of branching as shown in table 7.

Example-8

Using 0.5 phr of PETA, batch was prepared with perfect dispersion as described in Example-1 & 4 using temperature profile as in example-5 without using any initiator & stabilizer in reaction system. The kneading and extrusion was carried out in the absence of nitrogen blanketing. The properties of the resultant product are given in Table 8 mentioned below.

Example-9

2 kg batch of PP-ICP (MI: 1.5 dg/min) was prepared using 0.60% PETA which was dispersed & thoroughly mixed by high speed mixer for 10 min. Stabilizers were used for batch preparation in ppm level as given in table-9. However, this pre-dispersed material was further kneaded & extruded in a bigger single screw extruder having l/d ratio 25 which was conducted at a temperature Profile: zone 1—185° C., zone 2—240° C., zone 3—250° C. and zone 4—245° C. at rpm-55. The reaction was aggressive & showed melt fracture giving an indication of extensive branching. The MFI reduced from 1.5 to 0.23 even at this lower dose of PETA & revealed higher melt viscosity.

Example-10

2.0 MI polypropylene homopolymer fluff was mixed with normal stabilizer package along with 1-2% modifier (PETA) in 10 kg batch using typical temperature profile as 195, 210, 210, 225, 230, 230, 230, 230/230, 205° C. and 250-300 RPM as given in table 10. Co-rotary twin-screw compounder was used for reactive extrusion. The screw diameter of the extruder was 30 mm and L/D as 40:1. The configuration of the screw was tailored for the reactive extrusion While keeping the output as 12 kgs during modification melt pressure and torque remained unchanged. Total stabilizer concentration was maintained as 1000 to 1500 ppm. Presence of stabilizer has been found to control the undesired chain scission reaction thus supporting a two fold drop in MFI. Lower temperature and lower concentration of stabilizers favored modification reaction with no major change in melt pressure and torque. The modified polypropylene was found to performance satisfactorily in a tubular upward blown film trial.

Example-11

PP-ICP grade of MI 1.5 was used as a base material for making 2 kg batch in presence of 0.60% PETA & master batch Luprox 101 catalyst maintaining concentration of 7 ppm using 750 ppm of Irgaphos-168 & 250 of Irganox1010 followed by 600 ppm CAS where all ingredients were mixed together perfectly using an effective & efficient process of dispersion as described in Example-1 & 4. The kneading and extrusion was carried out using single screw extruder (L/D 25:1). The MFI of the polymer reduced from 1.5 to 0.42 g/10 min, crystallization temperature (Tc) increased and tan δ dropped on modification as shown in tab-11.

Example-12

Propylene copolymer of PP-ICP grade of MI 1.5 dg/min was used as a base material for making 2 kg batch in presence of 0.60% PETA using 1000 ppm of Irgafos 168 & 150 of Irganox 1010 followed by 600 ppm of CAS where all ingredients were mixed together perfectly using an effective & efficient process of dispersion as described in Example-1 & 4. The kneading and extrusion was carried out maintaining the temperature profile as per Example-9. Further, the same experiment was conducted on a pilot scale twin screw extruder (L/D—25:1) using same recipe in 10 kg batch where all ingredients were pre-dispersed in high speed automated mixer at 55 to 65° C. for 5 to 10 min. to ensure homogeneity in mixing prior to extrusion except a minor change in temperature profile & rpm. Extrusion was carried out at optimum temperature profile 195-250-260-260-260-260-258-263-263° C. & rpm 170 respectively. Extruded granules were prepared under water cut. This modification led to incorporation of long chain branching as indicated by MW increase & drop in MFI (i.e. dropped from 1.5 to 0.6 dg/10 min.) as shown in table-12, FIG. 3. This material also showed higher shear sensitivity with high value of shear viscosity at low frequency & indicated the presence of high MW fraction in the chain. The thermal characteristics of PP-ICP provide evidence of broadening of processing window. The mechanical properties showed that notched Izod impact strength enhancement to 2 to 3 times when compared with virgin without sacrificing any other physical properties. All these results were summarized in table-12. Sheet extrusion study of modified PP-ICP on commercial line indicated smooth process run with no additional power requirement than 1.5 MI copolymer despite being a fractional MI material.

The above description intends to describe the outline of the present invention. The said description and terminologies contained are for clarity of presentation only and do not limit the scope of the preset invention. Moreover, modifications and additions may be made to adapt the system and methods of the present invention to a variety of applications where audio-visual feedback of the speech signal is desirable, as will be apparent to those skilled in the art based upon the foregoing disclosure. The foregoing embodiments are merely illustrations of the principles of this invention, and therefore various modifications can be made by those skilled in the art without departing from the scope and spirit of the invention. It is therefore to be understood that all variations, modifications and changes are believed to fall within the scope of the present invention as defined by the appended claims.

TABLE 1

Modification of PP with PETA following dispersion at different time interval

| Sr. No | PFM, % W/W PETA | PFM, % W/W TMPTA | MFI, g/10 min. (At different dispersion time, hrs) 02 | MFI, g/10 min. (At different dispersion time, hrs) 16 | $\eta$, Poise @0.1 rad/s | Tan $\delta$ | PI |
|---|---|---|---|---|---|---|---|
| 1 | 0 | 0 | 3.77 | — | 107000 | 5.27 | 3.12 |
| 2 | 2.0 | 0 | 1.18 | 0.52 | 152000 | 2.55 | 4.15 |
| 3 | — | 2.0 | 2.31 | 0.71 | 132000 | 3.05 | 3.98 |

TABLE 2

Rheological and molecular weight data of modified PP homopolymer

| S. No | PETA, % (w\w) | MFI, g/10 min | G', dyne/cm$^2$ | G'', dyne/cm$^2$ | Viscosity ($\eta$), Poise At 0.1 RAD/sec ($10^5$) | Viscosity ($\eta$), Poise At 250 RAD/Sec | $M_n$ | $M_w$ ($10^5$) | $M_{z+1}$ ($10^6$) | MWD |
|---|---|---|---|---|---|---|---|---|---|---|
| 1 | 0 | 3.78 | 1561 | 8629 | 0.88 | 4227 | 106000 | 3.3 | 3.13 | 3.12 |
| 2 | 1.0 | 1.25 | 3063 | 9412 | 0.99 | 4127 | 92381 | 3.42 | 4.44 | 3.7 |
| 3* | 1.0 | 0.67 | 4051 | 12032 | 1.26 | 4328 | 93038 | 3.69 | 5.44 | 3.69 |
| 4 | 2.0 | 0.52 | 4748 | 12336 | 1.32 | 4315 | 90418 | 3.75 | 6.02 | 4.15 |
| 5* | 2.0 | 0.48 | 5203 | 13150 | 1.41 | 4454 | 92857 | 3.83 | 6.08 | 4.12 |
| 6 | 4.0 | 0.47 | 6944 | 13809 | 1.54 | 4564 | 89009 | 3.95 | 7.13 | 4.43 |
| 7* | 4.0 | 0.31 | 5045 | 12465 | 1.34 | 4387 | 91789 | 3.79 | 6.0 | 4.12 |

*include 0.2% Irgaphos 168

TABLE 3

Melt rheological & thermal data at different PETA concentration

| S. No. | PETA | MFI, g/10 min. | $\eta$, Poise @0.1 rad/s | tan$\delta$ | Mz + 1 ($10^6$) | MWD | Tc, ° C. |
|---|---|---|---|---|---|---|---|
| 1 | 0 | 3.78 | 107000 | 5.27 | 3.13 | 3.12 | 118 |
| 2 | 1.0 | 1.08 | 127000 | 2.29 | 6.23 | 4.39 | 126 |
| 3 | 2.0 | 0.28 | 166000 | 1.79 | 8.63 | 5.00 | 127 |
| 4 | 3.0 | 0.20 | 174000 | 2.04 | 8.33 | 4.84 | 126 |
| 5 | 4.0 | 0.16 | 178000 | 2.02 | 8.04 | 4.71 | 125 |

TABLE 4

Summary of melt characteristics & thermal data of Virgin and modified PP samples

| S. No. | PETA, % W/W | MFI, g/10 min | $\eta$, Poise @0.1 rad/s | Tan$\delta$ | Mz + 1 ($10^6$) | MWD | Tc, ° C. |
|---|---|---|---|---|---|---|---|
| 1 | 0.0 | 3.78 | 107000 | 5.27 | 3.13 | 3.12 | 118 |
| 2 | 2.0 | 0.18 | 176000 | 1.59 | 9.23 | 5.25 | 128 |

TABLE 5

Melt & Thermal characteristics of unmodified and modified PP samples

| S. No | PFM, % W/W | Xylene Solubles, % | MI dg/min | $MI_{7.16}/MI_{2.16}$ | Ratio of $\eta(r = 70\ S^{-1})$ and $\eta(r = 700\ S^{-1})$ | Puff-up Ratio | Tc, °C |
|---|---|---|---|---|---|---|---|
| 1 | Nil | 100 | 3.54 | 6.96 | 3.71 | 1.25 | 113.9 |
| 2 | 2.5 | 38.2 | 0.31 | 7.06 | 5.89 | 2.22 | 128.5 |

TABLE 6

Melt & Effect of Irgaphos-168 concentration on modification of Homo PP - melt and thermal characteristics

| S. No. | Irg-168, ppm | MFI, g/10 min. | η, Poise @0.1 rad/s | Tan δ | $M_{z+1}$ $(10^6)$ | MWD | Tc. °C |
|---|---|---|---|---|---|---|---|
| 1 | Nil | 1.28 | 106000 | 2.29 | 6.23 | 4.04 | 126 |
| 2 | 1000 | 0.70 | 116000 | 1.79 | 8.63 | 3.95 | 127 |
| 3 | 2000 | 0.52 | 116000 | 2.04 | 8.33 | 4.08 | 126 |
| 4 | 3000 | 0.95 | 112000 | 2.02 | 8.04 | 3.89 | 125 |

PETA: 1.0% W/W; Batch Size: 1.0 KG; T (° C.): 177-227-232-227; RPM: 25

TABLE 7

Data on melt rheology and thermal analysis of PP-ICP before and after modification

| S. No. | PETA, % W/W | MFI, g/10 min. | η, Pa·s @0.1 rad/s | Tanδ | $M_{z+1}$ $(10^6)$ | MWD | Tc, °C |
|---|---|---|---|---|---|---|---|
| 1 | Nil | 2.82 | 11279 | 4.92 | 3.00 | 3.00 | 119 |
| 2 | 0.5 | 0.70 | 13709 | 2.60 | 4.97 | 3.77 | 126 |

TABLE 8

Characteristics of modified & reference PP samples

| S. No. | PETA, % W/W | Xylene Soluble, % | MI, g/10 min | $MI_{7.16}/MI_{2.16}$ | Ratio of $\eta(r = 70\ S^{-1})$ and $\eta(r = 700\ S^{-1})$ | Puff-up Ratio | Tc, °C |
|---|---|---|---|---|---|---|---|
| 1 | Nil | 100 | 3.54 | 6.96 | 3.71 | 1.25 | 113.9 |
| 2 | 0.5 | 90.8 | 1.80 | 7.82 | 4.63 | 1.74 | 119.2 |

TABLE 9

Change in melt rheology, MW, MWD and thermal properties on 1.5 MI PP-ICP on modification

| Sr. No. | PETA, % W/W | MFI, g/10 min. | η, Pa·s @0.1 rad/s | Tan δ | $M_{z+1}$ $(10^6)$ | MWD | Tc, °C |
|---|---|---|---|---|---|---|---|
| 1 | 0.00 | 1.48 | 17230 | 4.15 | 6.23 | 4.04 | 119 |
| 2 | 0.60 | 0.23 | 29700 | 1.45 | 8.63 | 3.95 | 126 |

PETA: 0.60% W/W; Batch Size: 2.0 KG; T (° C.): 185-240-250-245; RPM: 55; Irgaphos-168: 750 ppm & Irganox-1010: 250 ppm; Calcium stearate (CAS): 600 ppm

TABLE 10

Properties of modified PP homopolymer (modification using twin screw compounder)

| | | | Viscosity (η), Pa·s | | | |
|---|---|---|---|---|---|---|
| S. No. | PETA, 5 W/W | MI, dg/min | At 0.1 Rad/Sec | At 250 Rad/Sec | $M_{z+1}$ $(10^6)$ | MWD |
| 1 | Nil | 2.7 | 12492 | 411 | 5.1 | 3.97 |
| 2 | 1.0 | 0.8 | 14257 | 388 | 7.99 | 4.97 |

TABLE 11

Change in properties of PP-ICP (1.5 MI) on reactive modification

| S. No. | PETA, % W/W | MFI, g/10 min. | η, Pa·s @0.1 rad/s | Tan δ | $M_{z+1}$ $(10^6)$ | MWD | Tc, °C |
|---|---|---|---|---|---|---|---|
| 1 | Nil | 1.50 | 18670 | 3.85 | 5.15 | 3.55 | 119 |
| 2 | 0.60 | 0.42 | 26000 | 2.24 | 7.16 | 4.11 | 128 |

Batch: 2 kg; Luperox101: 7 ppm; T(° C.): 185-240-250-245; Screw rpm\: 55; Irgaphos-168: 750 ppm & Irganox-1010: 250 ppm; Calcium stearate(CAS): 600 ppm

TABLE 12

Modification of PP-ICP—on large batch size

| | | Stabilizer (g) 10 kg batch | | | | |
|---|---|---|---|---|---|---|
| S. No. | PETA wt % (g) | Irganox 1010 | Irgaphos 168 | MFI dg/min | Notch IZOD J/m | FM (MPa) |
| 1 | nil | 2.50 | 10.0 | 1.40 | 288 | 1071 |
| 2 | 46 | 4.50 | 10.0 | 0.60 | 611 | 1061 |

The invention claimed is:

1. A method of production of long chain branched polypropylene with high melt strength, comprising:
   a) admixing a base polypropylene polymer, a stabilizer and a coagent at a temperature in the range between 25° C. to 180° C. for 5 minutes to 120 minutes for initiation of grafting reaction in solid;
   b) incubating the reaction mixture at room temperature for 2 hours to 30 hours for continuation of the grafting reaction and for uniform dispersion of coagent on the said base polypropylene polymer; and
   c) extruding the reaction mixture at 10° to 80° C. above the melt temperature of the said base polypropylene polymer to allow completion of the grafting reaction during extrusion to obtain long chain branched polypropylene with high melt strength,
   wherein the stabilizer is Tris-(2,4-di-tert-butylphenyl)phopshite used at a concentration in the range between 200 ppm and 3000 ppm.

2. The method of production of long chain branched polypropylene with high melt strength according to claim 1, wherein steps of admixing and incubating the reaction mixture are performed under oxygen-free conditions.

3. The method of production of long chain branched polypropylene with high melt strength according to claim 1, wherein said base polypropylene polymer is polypropylene homopolymer or copolymer containing ethylene and propylene comonomers.

4. A method of production of long chain branched polypropylene with high melt strength, comprising:
   a) admixing a base polypropylene polymer, a stabilizer and a coagent at a temperature in the range between 25° C. to 180° C. for 5 minutes to 120 minutes for initiation of grafting reaction in solid;
   b) incubating the reaction mixture at room temperature for 2 hours to 30 hours for continuation of the grafting reaction and for uniform dispersion of coagent on the said base polypropylene polymer; and
   c) extruding the reaction mixture at 10° to 80° C. above the melt temperature of the said base polypropylene polymer to allow completion of the grafting reaction during extrusion to obtain long chain branched polypropylene with high melt strength,
   wherein the stabilizer is Pentaerythritol Tetrakis(3-(3,5-di-tert-butyl-4-hydroxyphenyl)propionate) used at a concentration in the range between 100 ppm and 1000 ppm.

5. The method of production of long chain branched polypropylene with high melt strength according to claim 1, wherein the said coagent is a polyfunctional monomer selected from the group consisting of Pentaerythritol Triacrylate, Trimethylolpropane Triacrylate, Hexadecylmethacrylate, Octadecylmethacrylate, Butylmethacrylate, and combinations thereof.

6. A method of production of long chain branched polypropylene with high melt strength, comprising:
   a) admixing a base polypropylene polymer, a stabilizer and a coagent at a temperature in the range between 25° C. to 180° C. for 5 minutes to 120 minutes for initiation of grafting reaction in solid;
   b) incubating the reaction mixture at room temperature for 2 hours to 30 hours for continuation of the grafting reaction and for uniform dispersion of coagent on the said base polypropylene polymer; and
   c) extruding the reaction mixture at 10° to 80° C. above the melt temperature of the said base polypropylene polymer to allow completion of the grafting reaction during extrusion to obtain long chain branched polypropylene with high melt strength,
   wherein rate of branching achieved is directly proportional to the concentration of Pentaerythritol Triacrylate as a coagent, said concentration being in the range between 1 to 4% w/w.

7. Polypropylene product, master batch, films, containers or other polypropylene articles with high melt strength obtained by method of claim 1.

8. A composition for production of polypropylene with high melt strength via process of claim 1, said composition comprising:
   polypropylene polymer having melt index about 1.5 dg/min to serve as base for preparation of polypropylene product having high melt strength;
   mixture of Tris-(2,4-di-tert-butylphenyl)phopshite and Pentaerythritol Tetrakis(3-(3,5-di-tert-butyl-4-hydroxyphenyl)propionate) to serve as antioxidants; and
   pentaerythritol triacrylate coagent acting as a bridging group between the polymer chains in said base polymer.

9. The method of production of long chain branched polypropylene with high melt strength according to claim 1, wherein rate of branching achieved is directly proportional to the concentration of Pentaerythritol Triacrylate as a coagent, said concentration being in the range between 1 to 4% w/w.

10. The method of production of long chain branched polypropylene with high melt strength according to claim 4, wherein steps of admixing and incubating the reaction mixture are performed under oxygen-free conditions.

11. The method of production of long chain branched polypropylene with high melt strength according to claim 4, wherein said base polypropylene polymer is polypropylene homopolymer or copolymer containing ethylene and propylene comonomers.

12. The method of production of long chain branched polypropylene with high melt strength according to claim 4, wherein the said coagent is a polyfunctional monomer selected from the group consisting of Pentaerythritol Triacrylate, Trimethylolpropane Triacrylate, Hexadecylmethacrylate, Octadecylmethacrylate, Butylmethacrylate, and combinations thereof.

13. The method of production of long chain branched polypropylene with high melt strength according to claim 4, wherein rate of branching achieved is directly proportional to the concentration of Pentaerythritol Triacrylate as a coagent, said concentration being in the range between 1 to 4% w/w.

14. A composition for production of polypropylene with high melt strength via process of claim 4, said composition comprising:
   polypropylene polymer having melt index about 1.5 dg/min to serve as base for preparation of polypropylene product having high melt strength;
   mixture of Tris-(2,4-di-tert-butylphenyl)phopshite and Pentaerythritol Tetrakis(3-(3,5-di-tert-butyl-4-hydroxyphenyl)propionate) to serve as antioxidants; and
   pentaerythritol triacrylate coagent acting as a bridging group between the polymer chains in said base polymer.

15. The method of production of long chain branched polypropylene with high melt strength according to claim 6, wherein steps of admixing and incubating the reaction mixture are performed under oxygen-free conditions.

16. The method of production of long chain branched polypropylene with high melt strength according to claim 6, wherein said base polypropylene polymer is polypropylene homopolymer or copolymer containing ethylene and propylene comonomers.

17. A composition for production of polypropylene with high melt strength via process of claim 6, said composition comprising:
- polypropylene polymer having melt index about 1.5 dg/min to serve as base for preparation of polypropylene product having high melt strength;
- mixture of Tris-(2,4-di-tert-butylphenyl)phopshite and Pentaerythritol Tetrakis(3-(3,5-di-tert-butyl-4-hydroxyphenyl)propionate) to serve as antioxidants; and
- the pentaerythritol triacrylate coagent acting as a bridging group between the polymer chains in said base polymer.

\* \* \* \* \*